United States Patent
Zeng

(10) Patent No.: US 6,496,492 B1
(45) Date of Patent: Dec. 17, 2002

(54) HAND OFF CONTROL FOR REDUCING RATE OF OCCURRENCE OF FORCED DISCONNECTION OF COMMUNICATION

(75) Inventor: Qing-An Zeng, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/387,734

(22) Filed: Sep. 1, 1999

(30) Foreign Application Priority Data

Sep. 1, 1998 (JP) ............................................ 10-247417

(51) Int. Cl.⁷ ................................................ H04Q 7/00
(52) U.S. Cl. ........................ 370/331; 370/331; 370/332; 455/336
(58) Field of Search ................................. 370/317, 318, 370/331, 332, 333, 334, 337, 336, 341, 347, 442, 345; 455/403, 405, 422, 424, 423, 436, 437, 438, 439

(56) References Cited

U.S. PATENT DOCUMENTS

| | | | | |
|---|---|---|---|---|
| 5,649,000 A | * | 7/1997 | Lee et al. | 370/331 |
| 5,805,995 A | * | 9/1998 | Jiang et al. | 455/436 |
| 5,903,840 A | * | 5/1999 | Bertacchi | 370/332 |
| 5,999,814 A | * | 12/1999 | Cuffaro et al. | 370/331 |
| 6,069,882 A | * | 5/2000 | Zellner et al. | 370/329 |
| 6,208,858 B1 | * | 3/2001 | Antonio et al. | 370/331 |

FOREIGN PATENT DOCUMENTS

| | | |
|---|---|---|
| JP | 5-130671 | 5/1993 |
| JP | 6-509456 | 10/1994 |
| JP | 6-315186 | 11/1994 |
| JP | 7-23449 | 1/1995 |
| JP | 0 669 775 | 8/1995 |
| JP | 7-240959 | 9/1995 |
| JP | 7-264656 | 10/1995 |
| JP | 10-502229 | 2/1998 |
| JP | 1999-016054 A | 3/1999 |
| JP | 0 955 781 | 11/1999 |
| JP | 2000-0010343 | 2/2000 |

OTHER PUBLICATIONS

D. Hong et al., "Traffic Model and Performance Analysis for Cellular Mobile Radio Telephone Systems with Prioritized and Nonprioritized Handoff Procedures", IEEE Transactions on Vehicular Technology, vol. VT–35, No. 3, Aug. 1986, pp. 77–92.

Q. Zeng et al. "Performance Analysis of Mobile Cellular Radio System with Priority Reservation Handoff Procedures", IEEE VTC–94 Proc. vol. 3, Jun. 1994, pp. 1829–1833.

(List continued on next page.)

Primary Examiner—Lee Nguyen
Assistant Examiner—Congvan Tran
(74) Attorney, Agent, or Firm—Sughrue Mion, PLLC

(57) ABSTRACT

A hand-off control method is disclosed that can reduce the rate of occurrence of forced disconnection of communication. The intensity of signals received from a base station is periodically measured in a mobile station, the amount of relative change in received signal intensity is calculated for every measurement interval, and the measurement results and calculation results are notified to the base station and the base station of the hand-off destination. If the mobile station requests hand-off, the call of the mobile station is allocated in the hand-off destination base station to an appropriate queue among a plurality of queues that are given an order of priority, based on the amount of relative change for the call. The call is reallocated to a queue that corresponds to the new amount of relative change whenever the amount of relative change is updated. In addition, the waiting rank of the call within the queue is determined based on the received signal intensity at the mobile station. When free channels are available in the destination cell of the moving mobile station, calls allocated to queues are assigned to free channels in an order that is based on the priority of the queues and the waiting rank within the queue.

22 Claims, 11 Drawing Sheets

OTHER PUBLICATIONS

H.G. Ebersman et al., "Handoff Ordering using Signal Prediction Priority Queuing in Personal Communications System", Sixth IEEE International Symposium on Personal, Indoor and Mobile Radio Communication, (1995), pp. 824–828 with Abstract.

Y. Lin et al., PCS Channel Assignment Strategies for Hand–off and Initial Access Analyzing the Trade–off Between Implementation Costs and Performance, IEEE Persona Communications, vol. 1, No. 3, Jul. 1, 1994, pp. 47–56.

Q. Zeng, "Performance Analysis of Two–level Priority Reservation Handoff Scheme in Mobile Cellular Radio Systems", IEEE Vehicular Technology Conference, May 4, 1997, pp. 974–978 with Abstract.

* cited by examiner

HAND OFF CONTROL FOR REDUCING RATE OF OCCURRENCE OF FORCED DISCONNECTION OF COMMUNICATION

BACKGROUND OF THE INVENTION

1. Field of the Invention

The present invention relates to a cellular communication system, and more particularly to a hand-off control method and hand-off control system for performing hand-off by giving priorities to calls.

2. Description of the Related Art

Subscribers to mobile communication systems have steadily increased in recent years, and an increase in capacity for subscribers is consequently in great demand. Reducing cell radius has been considered as one way of increasing the subscriber capacity in a mobile communication system. Reducing the cell radius, however, brings about an increase in the number of base stations in a particular area and can increase the number of channels used by subscribers.

FIG. 1a illustrates a hand-off control method in a typical mobile communication system, and FIG. 1b shows a case in which the cell radius is reduced from the case shown in FIG. 1a.

A case is described as shown in FIG. 1a in which mobile station 110, which is present within cell 130a of base station 120a and receiving service from base station 120a, moves toward cell 130b of base station 120b.

As mobile station 110 moves away from base station 120a, the intensity of signals from base station 120a received at mobile station 110 gradually diminishes. In this case, the intensity of received signals refers to the level of power received from the base station.

The intensity of signals from base station 120a received at mobile station 110 is periodically measured. When the measured received signal intensity falls below a predetermined threshold, a hand-off request is transmitted from mobile station 110 to base station 120a, and mobile station 110 is accordingly allowed to also receive service from base station 120b.

The hand-off request sent from mobile station 110 to base station 120a is notified to base station 120b from base station 120a by way of a network (not shown), whereupon mobile station 110 can receive service from both base stations 120a and 120b.

Then, as mobile station 116 moves farther away from base station 120a, the service from base station 120a is halted and mobile station 110 receives service only from base station 120b.

The region in which mobile station 110 can receive service from both base stations 120a and 120b is area 140, which is the region in which cell 130a and cell 130b overlap.

The above-described hand-off operation is carried out with greater frequency as the cell radius is reduced as shown in FIG. 1b. Hand-off traffic thus increases as the cell radius is reduced, making forced disconnection of communication more likely to occur.

To prevent such forced disconnection, a method in which queues are maintained for requests from mobile stations requiring hand-off is disclosed in, for example, "Traffic model and performance analysis for cellular mobile radio telephone systems with prioritized and nonprioritized hand-off procedures" by D. Hong and S. S. Rappaport (IEEE Transactions on Vehicular Technology, Vol. VT-35, 1986) and "Performance analysis of mobile cellular radio systems with priority reservation hand-off procedures" by Q. A. Zeng, K. Mukumoto, and A. Fukuda (IEEE Proceedings, Vehicular Technology Conference-94, Vol. 3, 1994).

The former paper discloses a technique in which several channels dedicated to hand-off are always secured among the set channels. These secured channels are not used for new calls, and the rate of lost calls during hand-off can thus can be reduced.

The latter paper proposes adding a buffer for new call use to the technique disclosed in the former paper to provide a further reduction in the loss probability of new calls without appreciably raising the rate of disconnection of hand-off calls.

In addition, Japanese Patent Laid-open No. 264656/95 discloses a technique in which priority is assigned to a hand-off process request from a mobile station based on a calculation equation that takes into consideration the speed or the direction of movement of a moving mobile station, the hand-off process then being carried out in accordance with the priority.

Mobile stations that are moving between cells also move at various speeds, the speed of movement of mobile stations differing, for example, for a mobile station that moves by automobile and a mobile station that moves at walking speed. The permissible time interval from the request for hand-off to the completion of the hand-off process differs when the speeds of movement differ as described above, and merely carrying out the hand-off process sequentially in the order in which hand-off requests were received entails the danger of forced disconnection of a communication in mobile stations moving at high speed due to the lengthy interval from the time of hand-off request to the completion of the hand-off process.

A mobile station that is moving at high speed also passes through many cells in a prescribed time interval, and the number of requested hand-offs during a communication, as well as the possibility of forced disconnection of the communication, is therefore increased. Mobile stations that are moving between cells also have various paths of movement, with some mobile stations only moving away from the base station from which they are currently receiving service, and others maintaining a uniform distance from the base station.

The permissible time interval from the request for hand-off up to the completion of the hand-off process differs according to the various different paths of movement described above. Therefore, if the hand-off procedure is carried out merely sequentially in response to the requests from mobile stations requiring hand-off, there is the possibility that processing will be too late, resulting in the forced disconnection of communication in the case that the hand-off procedure is not carried out immediately upon request for hand-off for a mobile station that is moving away from the base station from which it is currently receiving service.

In addition, the method disclosed in Japanese Patent Laid-open No. 264656/95 suffers from the problems that calculation for giving priorities to calls is complex and, because priority is given to each call, processing is carried out frequently whenever hand-off is requested, make the processing complicated.

SUMMARY OF THE INVENTION

It is an object of the present invention to provide a hand-off control system and hand-off control method that can reduce the rate of occurrence of forced disconnection of communication by taking into consideration the permissible time interval from the request for hand-off by a mobile station until completion of the hand-off process.

To achieve the above-described object, the hand-off control system of this invention comprises: measuring means, calculating means, queue storing means, request processing means, waiting rank determining means; queue reallocating means, and queue control means.

The present invention thus constituted operates as follows: The intensity of signals received from a base station at a mobile station is periodically measured by the measuring means, and the amount of relative change for each measurement interval in the intensity of received signals measured by the measuring means is calculated by the calculating means. When hand-off is requested, the request processing means allocates the call of the mobile station that has requested hand-off to an appropriate queue of queues to which priorities are given in advance according to the amount of relative change based on the amount of relative change in the received signal intensity in the mobile station. The waiting rank determining means determines the waiting rank of a call of the mobile station within the queue in which the call of the mobile station has been allocated based on the intensity of received signals measured by the measuring means for every measurement interval of the intensity of received signals. When the amounts of relative change are updated, the queuing reallocating means periodically reallocates calls stored in each queue, for every measurement interval of the received signal intensity, such that the calls are stored in queues according to the amount of relative change in received signal intensity. The queue control means, on the other hand, monitors whether or not there are free channels within the destination cell of a moving mobile station. If there are free channels in the cell, the queue control means assigns calls allocated to the queue to free channels in an order that is based on the priority of the queue and the waiting rank within that queue.

Hand-off is thus performed in: an order that is based on the intensity of received signals and amount of relative change in the intensity of received signals at a mobile station. As a result, a mobile station for which the permissible time interval from the request for hand-off to the completion of the hand-off process is short, i.e., a mobile station that exhibits a large amount of relative change in the intensity of received signals, is processed before a mobile station for which the permissible time interval from the request for hand-off until the completion of the hand-off process is long, i.e., a mobile station that exhibits a small amount of relative change. In addition, the hand-off process for a mobile station for which the received signal intensity is weak and which is liable to be disconnected is also given higher priority.

In the hand-off control system of this invention, when the received signal intensity of a particular hand-off request call is updated, the waiting rank determining means updates the waiting rank of calls stored in each of the queues only in cases in which the received signal intensity is greater than a value obtained by adding a predetermined first hysteresis value (H1) to an upper threshold of the current waiting rank of that hand-off request call or smaller than a value obtained by subtracting the first hysteresis value (H1) from the lower threshold of the current waiting rank of the hand-off request call.

In the hand-off control system of this invention, when the amount of relative change of a particular hand-off request call is updated, the queue reallocating means reallocates calls stored in each of the queues only in cases in which the amount of relative change is greater than a value obtained by adding a predetermined second hysteresis value (H2) to the upper threshold of the class of the queue in which the hand-off request call is currently allocated or less than a value obtained by subtracting the second hysteresis value (H2) from the lower threshold of the class of queue in which the hand-off request call is currently allocated.

Thus, the use of a hysteresis characteristic in the judgment when waiting rank is determined by the waiting rank determining means and when queues are reallocated by the queue reallocating means, decreases the number of updating procedures, thereby cutting down the amount of control processing.

In an embodiment of the present invention, the amount of relative change in the intensity of received signals, when a mobile station for which the intensity of received signals was $P_0$ at a time to moves and the intensity of received signals is $P_1$ at time $t_1$, is defined as:

$$(P_1-P_0)/(P_1+P_0), (P_1-P_0)/P_1, (P_1-P_0)/P_0 \text{ or } (P_1-P_0)/(t_1-t_0)$$

The above and other objects, features and advantages of the present invention will become apparent from the following description with reference to the accompanying drawings which illustrate examples of the present invention.

BRIEF DESCRIPTION OF THE DRAWINGS

FIG. 1b shows a case in which the cell radius has been reduced from the size shown in FIG. 1a;

DETAILED DESCRIPTION OF THE PREFERRED EMBODIMENTS

First Embodiment

Figure 1A:
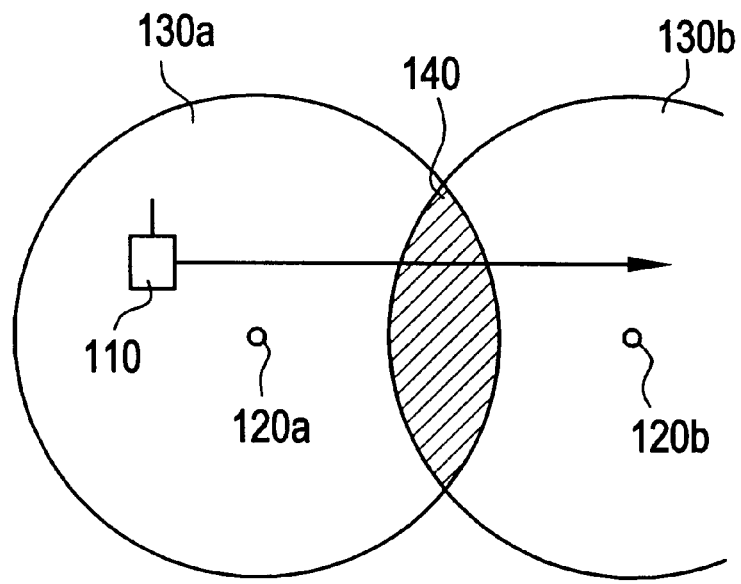
FIG. 1a is an explanatory view of a hand-off control system in a typical mobile communication system.
Figure 1B:
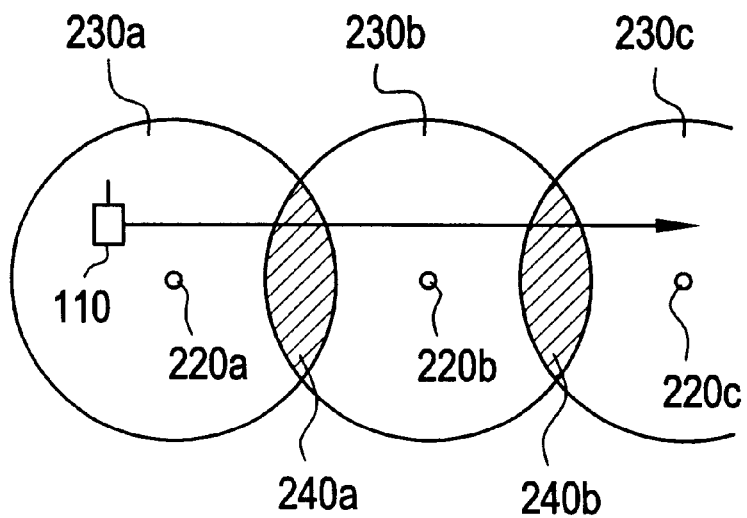
Figure 2:
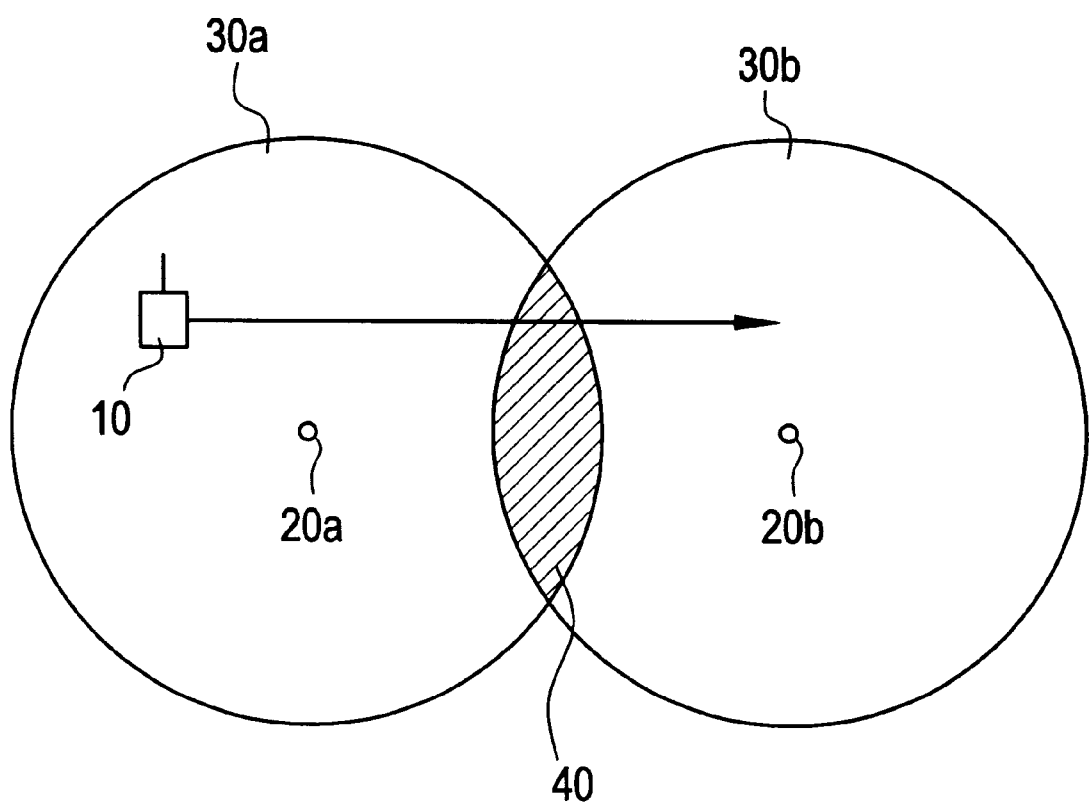
FIG. 2 shows a hand-off control system according to a first embodiment of the present invention.

As shown in FIG. 2, in the hand-off control method according to a first embodiment of the present invention, mobile station 10 is located within cell 30a of base station 20a, receiving service from base station 20a, and moving toward cell 30b of base station 20b.

The intensity of signals received from base station 20a is periodically measured at mobile station 10. Base station 20a is informed of the measured intensity of received signals and the amount of relative change in received signal intensity for each measurement interval.

Base station 20b within cell 30b, which is adjacent to cell 30a of base station 20a, is also informed of the received signal intensity and the amount of relative change in received signal intensity from base station 20a by way of a network (not shown).

At base stations 20a and 20b, not only are the received signal intensity and the amount of relative change in received signal intensity notified from mobile station 10 stored, but queues are produced in advance in which priority is given based on the amount of relative change in the received signal intensity. Upon transmission of a request for hand-off from mobile station 10, mobile station 10 is allocated at base stations 20a and 20b to an appropriate queue based on the amount of relative change in received signal intensity of mobile station 10 and, in addition, a waiting rank within the queue to which mobile station 10 is:assigned is determined based on the received signal intensity of mobile station 10. Hand-off control is subsequently performed based on the priority.

Figure 3A:
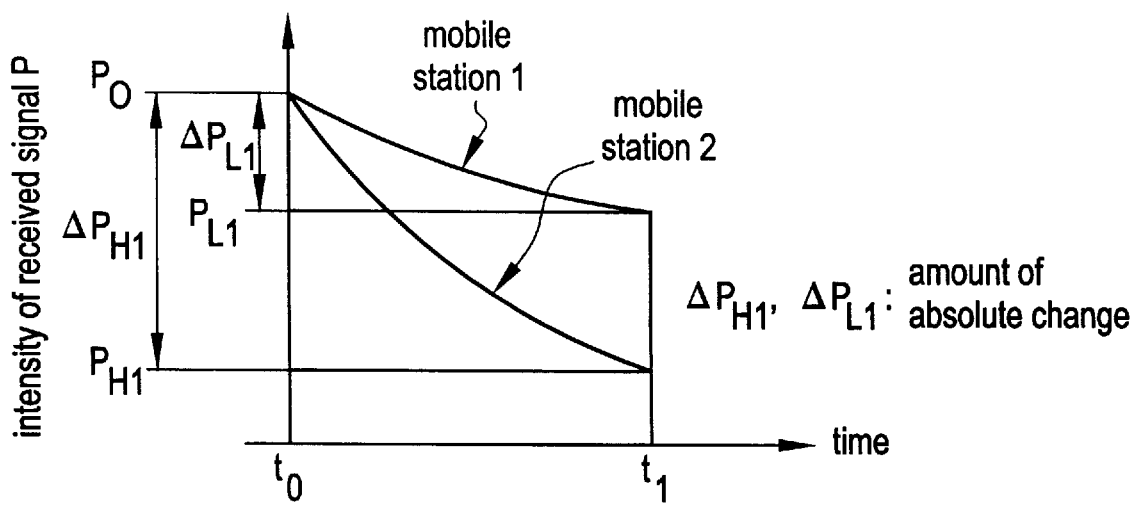
FIG. 3a is an explanatory view showing the calculation method of the intensity of received signals in a case in which two mobile stations have moved from positions having the same received signal intensities.
Figure 3B:
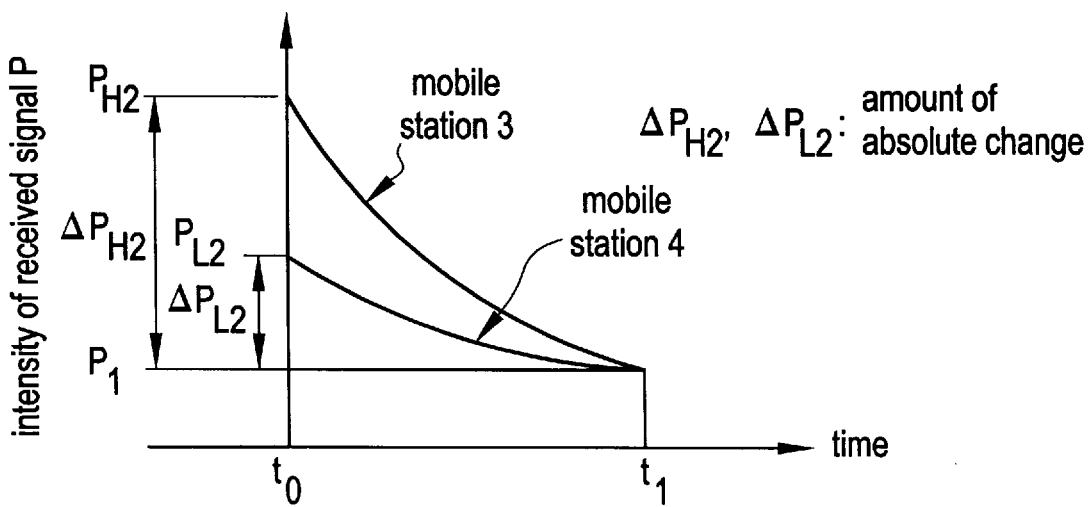
FIG. 3b is an explanatory view showing the calculation method of received signal intensity: in a case in which two mobile stations have moved from positions having different received signal intensities to positions for which the received signal intensities have reached the hand-off threshold value.

Explanation will next be presented with reference to FIGS. 3a and 3b regarding the method of calculating the amount of relative change in received signal intensity and the method of determining priority in this embodiment.

FIG. 3a and FIG. 3b are figures for explaining the method of calculating the received signal intensity in the hand-off control system shown in FIG. 2, FIG. 3a showing a case in which two mobile stations move from positions having the same received signal intensity, and FIG. 3b showing a case in which two mobile stations move from positions having different received signal intensities to positions in which the received signal intensities reach the hand-off threshold value. In FIG. 3a and FIG. 3b, the horizontal axis designates time, and the vertical axis designates received signal intensity.

In FIG. 3a, it is assumed that a mobile station having a received signal intensity of $P_0$ at time $t_0$ moves such that the received signal intensity becomes $P_{L1}$ at time $t_1$. In this case, the amount of relative change is defined as:

$$(P_{L1}-P_0)/(P_{L1}+P_0)$$

In addition, a mobile station having a received signal intensity of $P_0$ at time to moves such that the received signal intensity becomes $P_{H1}$ at time $t_1$. The amount of relative change in this case is defined as:

$$(P_{H1}-P_0)/(P_{H1}+P_0)$$

In this case, the absolute change of the received field signal intensity of the mobile station for which the received signal intensity becomes $P_{L1}$ at time $t_1$ is $\Delta P_{L1}$. In addition, the absolute change in received field signal intensity of the mobile station for which the received signal intensity becomes $P_{H1}$ at time $t_1$ is $\Delta P_{H1}$, which is greater than the absolute change $\Delta P_{L1}$ in received field signal intensity of the mobile station for which the received signal intensity becomes $P_{L1}$ at time $t_1$. That is, the mobile station at which the received signal intensity becomes $P_{H1}$ at time $t_1$ is moving away from the base station more rapidly than the mobile station at which the received signal intensity becomes $P_{L1}$ at time $t_1$.

In a case in which a mobile station having a received signal intensity of $P_0$ at time $t_0$ moves such that the received signal intensity becomes $P_{L1}$ at time $t_1$, the aforementioned amount of relative change can be defined as $(P_{L1}-P_0)/P_{L1}$ or $(P_{L1}-P_0)/P_0$. Alternatively, in a case in which a mobile station having a received signal intensity of $P_0$ at time to moves such that the received signal intensity becomes $P_{H1}$ at time $t_1$, the amount of relative change can be defined as $(P_{H1}-P_0)/P_{H1}$ or $(P_{H1}-P_0)/P_0$.

In FIG. 3b, it is assumed that a mobile station having a received signal intensity of $P_{L2}$ at time to moves such that the received signal intensity at time $t_1$ becomes the hand-off threshold value $P_1$. The amount of relative change in this case is defined as $(P_1-P_{L2})/(t_1-t_0)$.

A mobile station having a received signal intensity of $P_{H2}$ at time to moves such that the received signal intensity becomes the hand-off threshold value $P_1$ at time $t_1$. The amount of relative change in this case can be defined as $(P_1-P_{H2})/(t_1-t_0)$.

In this case, the absolute change in received field signal intensity of the mobile station having a received signal intensity of $P_{L2}$ at time to is $\Delta P_{L2}$. The absolute change in received field signal intensity of the mobile station having a received signal intensity of $P_{H2}$ at time $t_0$ is $\Delta P_{H2}$, which is greater than the absolute change $\Delta P_{L2}$ in received field signal intensity of the mobile station having a received signal intensity of $P_{L2}$ at time $t_0$. That is, the mobile station having a received signal intensity of $P_{H2}$ at time $t_0$ is moving away from the base station more rapidly than the mobile station having a received signal intensity of $P_{L2}$ at time $t_0$.

Figure 4:
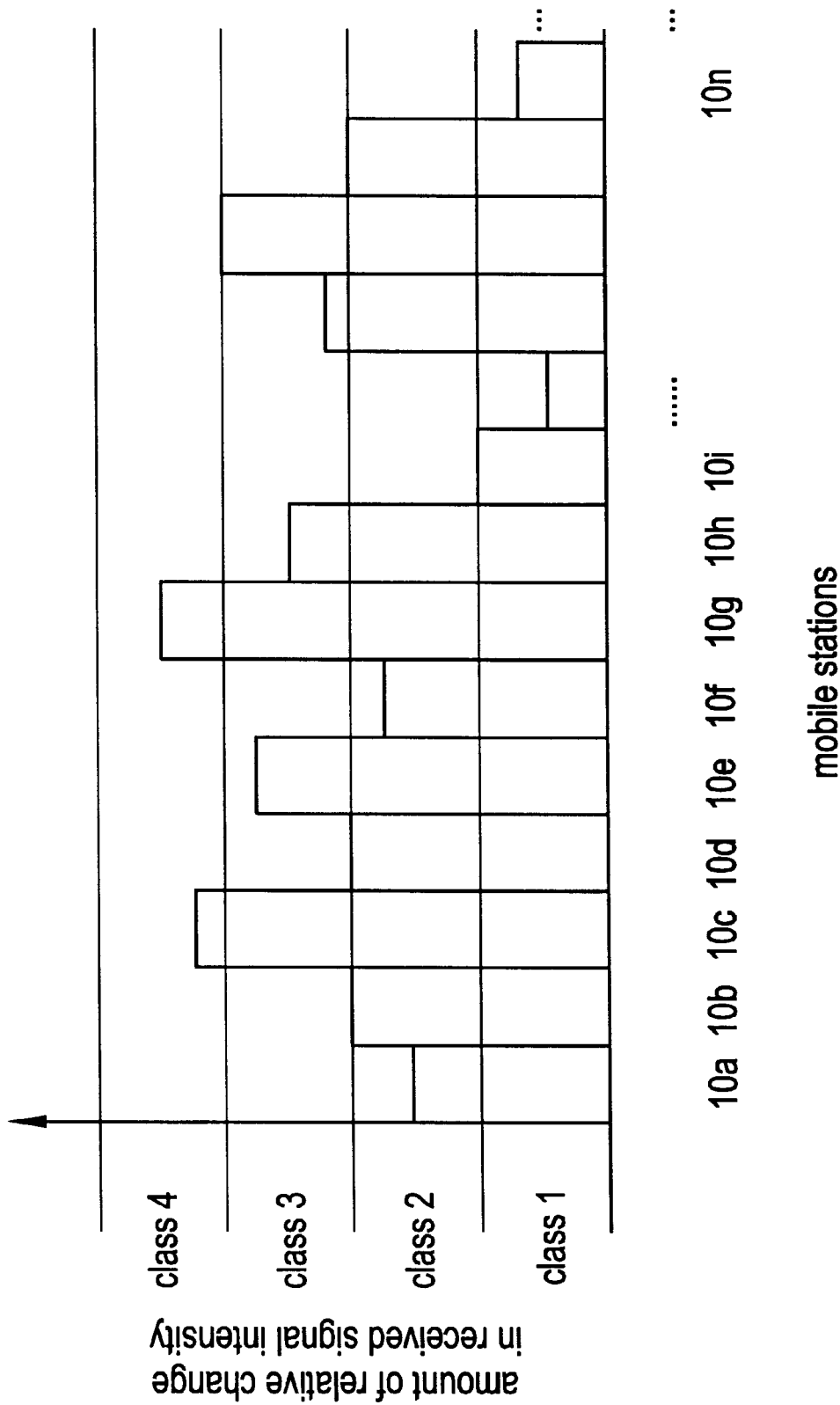
FIG. 4 is an explanatory view showing the determination method of priority in the mobile station hand-off process of the hand-off control system shown in FIG. 2.

As shown in FIG. 4, the priority of a mobile station in this embodiment is determined based on the amount of relative change in received signal intensity of that mobile station. The amount of relative change in received signal intensity is grouped into four classes by amount, and the priority of each mobile station is determined according to the class of the amount of relative change in the received signal intensity for that mobile station. As an example, if mobile station 10a fits into class 2, mobile station 10b fits into class 3, and mobile station 10c fits into class 4, class 4 has the highest priority and class 1 has the lowest priority.

Explanation will next be presented regarding the details of the constructions of a mobile station and base station in this embodiment.

Figure 5:
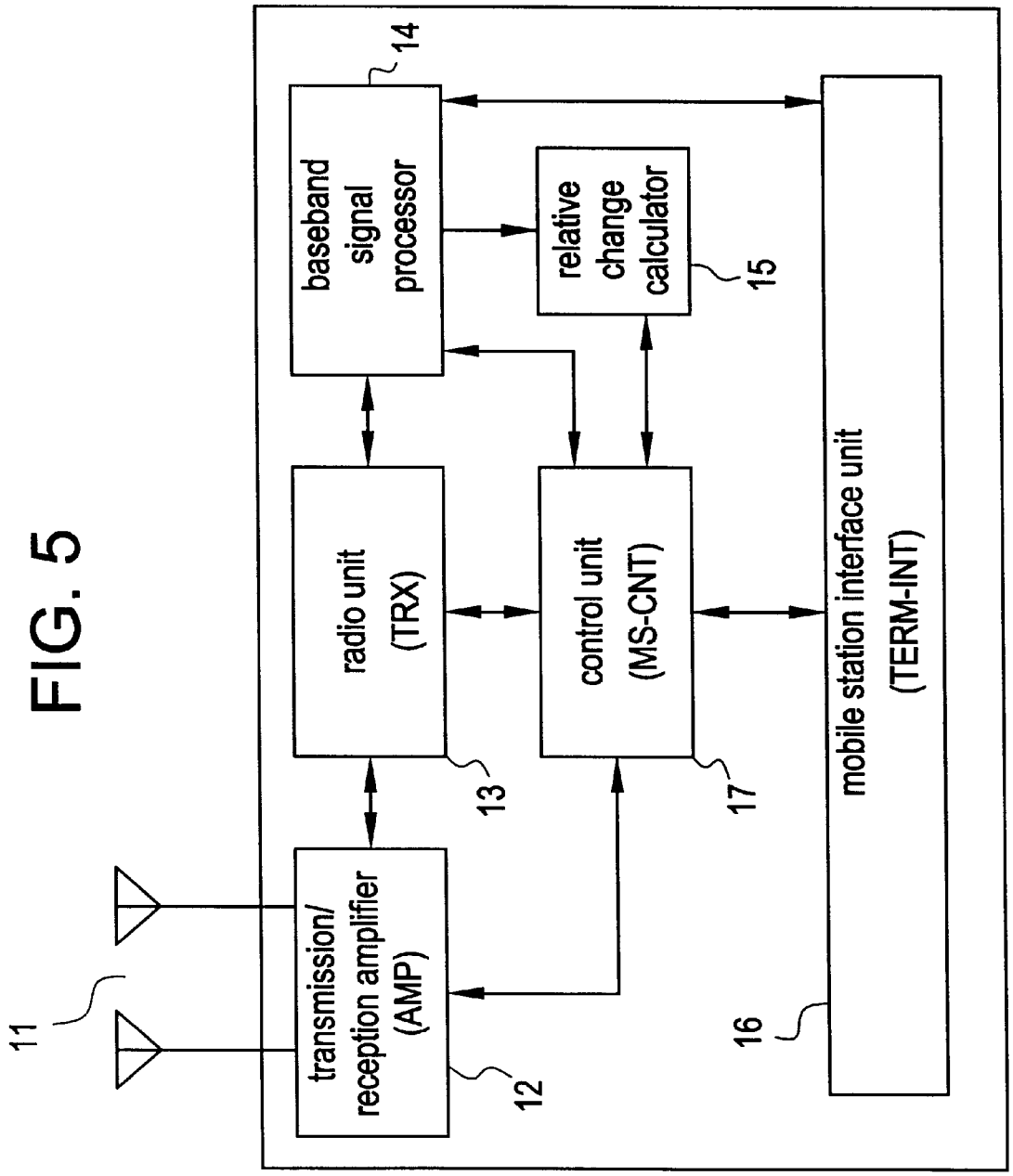
FIG. 5 is a block diagram showing an example of the construction of a mobile station in the hand-off control system shown in FIG. 2.

As shown in FIG. 5, mobile station 10 in this embodiment comprises: antenna 11 for transmitting and receiving radiowaves, transmission/reception: amplifier 12, radio unit 13, baseband signal processor 14, relative change calculator 15, mobile station interface unit 16, and control unit 17.

Transmission/reception amplifier 12 not only amplifies received RF signals received by way of antenna 11 and transmitted RF signals transmitted by way of antenna 11, but also demultiplexes received RF signals and transmitted RF signals.

Radio unit 13 quasi-synchronously and detects received RF signals amplified by transmission/reception amplifier 12 for conversion to digital signals, converts signals to be transmitted by way of antenna 11 to analog signals, and converts the signals to transmission RF signals through orthogonal modulation.

Baseband signal processor 14 performs baseband signal processing such as the demodulation, synchronization, error-correcting decoding, and data demultiplexing of received signals converted to digital signals by radio unit 13 as well as the error-correcting encoding, framing, and data modulation of signals to be transmitted by way of antenna 11. Baseband signal processor 14 includes measuring means for periodically measuring the intensity of received signals from base station 20a.

Relative change calculator 15 is a calculating means for calculating the amount of relative change by measurement interval in the intensity of received signals measured at baseband processor 14.

Mobile station interface unit 16 has a speech CODEC and data adapter function, and interfaces with a handset connected to the outside or with an outside data mobile station (not shown).

Control unit 17 includes a radio control function to transmit and receive control signals and controls the operations of transmission/reception amplifier 12, radio unit 13, baseband signal processor 14, relative change calculator 15 and mobile station interface unit 16.

When mobile station 10 transmits signals to base station 20a, signals received by way of mobile station interface unit 16 undergo baseband signal processing in baseband signal processor 14, and then are converted to analog signals in radio unit 13.

Transmission/reception amplifier 12 then amplifies the signals converted to analog signals in radio unit 13, and transmits the amplified signals to base station 20a by way of antenna 11.

In the case of receiving signals transmitted from base station 20a, on the other hand, the signals received by way of antenna 11 are first amplified in transmission/reception amplifier 12. The amplified signals are quasi-synchronously, detected and converted to digital signals in radio unit 13, following which the signals converted to digital signals in radio unit 13 undergo baseband processing in baseband signal processor 14 and are then outputted by way of mobile station interface unit 16.

In addition, the intensity of received signals from base station 20a is periodically measured in baseband signal processor 14, and the amount of relative change in the received signal intensity measured; in baseband signal processor 14 is calculated for each measurement interval in relative change calculator 15.

The received signal intensity measured in baseband signal processor 14 and the amount of relative change in received signal intensity calculated in relative change calculator 15 are simultaneously notified to base station 20a at a prescribed period.

Figure 6:
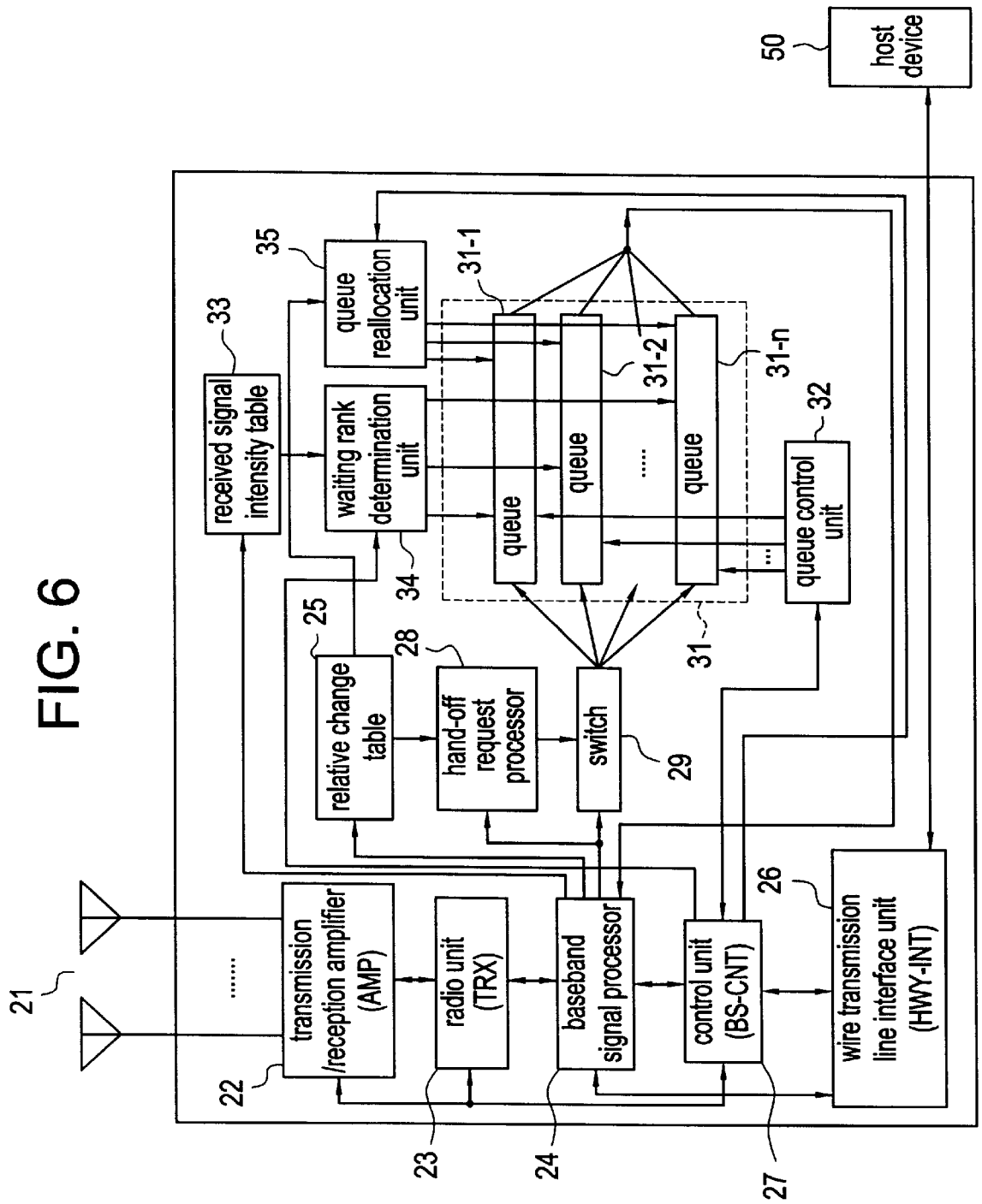
FIG. 6 is a block diagram showing an example of the construction of a base station in the hand-off control system shown in FIG. 2.

FIG. 6 is a block diagram showing an example of the construction of base stations 20a and 20b in the hand-off control system shown in FIG. 2.

As shown in FIG. 6, each of base stations 20a and 20b in this embodiment comprises antenna 21 for receiving and transmitting radiowaves, transmission/reception amplifier 22, radio unit 23, baseband signal processor 24, relative change table 25, received signal intensity table 33, wire transmission line interface unit 26, queue unit 31, hand-off request processor 28, switch 29, waiting rank determination unit 34; queue control unit 32, and control unit 27.

Transmission/reception amplifier 22 amplifies received RF signals received by way of antenna 21 and transmitted RF signals to be transmitted by way of antenna 21, and demultiplexes received RF signals and transmitted RF signals.

Radio unit 23 not only quasi-synchronously and detects received RF signals amplified by transmission/reception amplifier 22 and converts the signals to digital signals, but also converts signals to be transmitted by way of antenna 21 to analog signals and converts the signals to transmitted RF signals by modulation.

Baseband signal processor 24 carries out baseband signal processing such as demodulation, synchronization, error-correcting decoding, and data demultiplexing of received signals that have been converted to digital signals by radio unit 23, as well as the error-correcting encoding, framing, and data modulation of transmitted signals to be transmitted by way of antenna 21.

Relative change table 25 is a first storing means for storing, of the signals-processed at baseband signal processor 24, the amount of relative change in received signal intensity that is notified from mobile station 10.

Received signal intensity table 33 is a second storing means for storing, of the signals processed at baseband signal processor 24, the received signal intensity notified from mobile station 10.

Wire transmission line interface 26 interfaces with host device 50 connected to the outside.

Queue unit 31 stores queues 31-1–31-n that are given priority based on the amount of relative change in received signal intensity.

When a mobile station requests hand-off, hand-off request processor 28 allocates the call of the mobile station to a queue 31-1–31-n in queue unit 31 based on the amount of relative change in received signal intensity of the mobile station that is stored in relative change table 25.

Switch 29 performs switching of processes of queues 31-1–31-n in queue unit 31 based on judgment in hand-off request processor 28.

Waiting rank determination unit 34 determines the waiting rank of calls in each of queues 31-1–31-n based on the received signal intensity of that mobile station stored in received signal intensity table 33.

If amounts of relative change stored in relative change table 25 are updated, queue reallocation unit 35 periodically reallocates hand-off request calls stored in each of queues 31-1–31-n such that the calls are stored in queues that accord with the amounts of relative change of received signal intensities for each mobile station stored in relative change table 25.

Queue control unit 32 monitors whether or not there are free channels in a cell, and if free channels are present monitors whether or not there are hand-off request calls within queues 31-1–31-n. If hand-off request calls are present, queue control unit 32 assigns hand-off request calls to free channels based on the priority of queues 31-1–31-n and the waiting rank of the calls in each of queues 31-1–31-n.

Control unit 27 controls the operations of transmission/reception amplifier 22, radio unit 23, baseband signal processor 24, wire transmission line interface 26, and queue control unit 32, and transmits and receives control signals with a host device 50, to manage, sets, and disconnects radio lines.

As for the priority of queues 31-1–31-n within queue unit 31, queue 31-1 has the highest priority and queue 31-n has the lowest priority. In addition, waiting rank within each of queues 31-1–31-n is controlled such that mobile stations are arranged in order starting from the mobile station having the weakest received signal intensity. Further, the received signal intensities stored in received signal intensity table 33 are updated with every notification of received signal intensity from mobile station 10, and waiting rank determination unit 34 determines the waiting rank of calls in each of queues 31-1–31-n each time the received signal intensities stored in received signal intensity table 33 are updated.

Operation of the hand-off control system that is configured will next be described with reference to FIGS. 7a to 9.

Figure 7A:
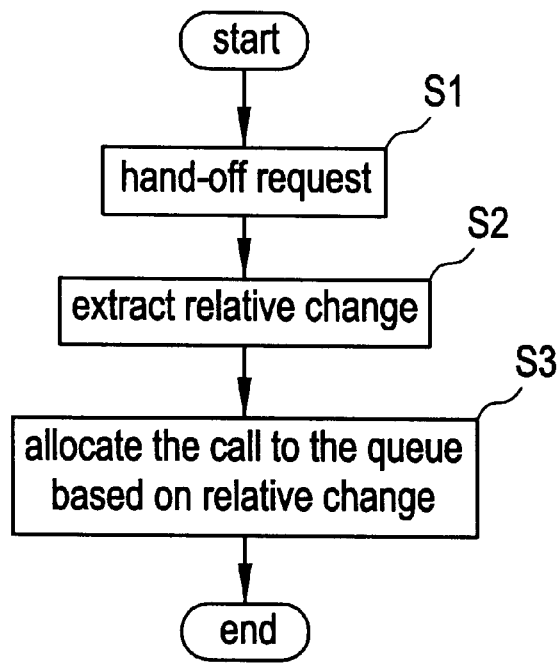
FIG. 7a is a flow chart illustrating procedures in hand-off request processor 28.

Explanation is first presented with reference to FIG. 7a regarding the operations in hand-off request processor 28.

The intensity of signals received from base station 20a is periodically measured at mobile station 10, and the measured received signal intensity and the amount of relative change in received signal intensity for each measurement interval are notified to base station 20a.

The received signal intensity of mobile station 10 that has been notified to base station 20a is stored in received signal intensity table 33 in base station 20a, the amount of relative change in received signal intensity is stored in relative change table 25 in base station 20a, and the received signal intensity stored in received signal intensity table 33 is updated each time notification comes from mobile station 10.

The received signal intensity and the amount of relative change in received signal intensity of mobile station 10 are notified from base station 20a to base station 20b by way of wire transmission line interface 26 and a network, and the received signal intensity of mobile station 10 is stored in received signal intensity table 33 within base station 20b and the amount of relative change in received signal intensity of mobile station 10 is stored in relative change table 25 within base station 20b.

The amounts of relative change in received signal intensity of mobile stations are grouped into a plurality of classes depending on their values; and queues 31-1–31-n, each of which are given a priority, are prepared in advance and stored in queue unit 31. Of queues 31-1–31-n, queue 31-1 is the class having the greatest amount of relative change in received signal intensity and has the highest priority, and queue 31-n is the class having the smallest amount of relative change in received signal intensity and has the lowest priority.

The intensity of signals received from base station 20a at mobile station 10 gradually diminishes as mobile station 10 moves away from base station 20a. The intensity of signals received from base station 20a is periodically measured at mobile station 10, and when the measured received signal intensity falls below a predetermined hand-off threshold value, hand-off request is transmitted from mobile station 10 to base station 20a. The hand-off request transmitted to base station 20a from mobile station 10 is further notified from base station 20a to base station 20b by way of wire transmission line interface 26 and network.

In Step S1, if a request for hand-off processing is directed from mobile station 10 to base station 20a, this hand-off request is transmitted to base station 20b. In Step S2, hand-off request processor 28 in base station 20b extracts from relative change table 25 the amount of relative change in received signal intensity of mobile station 10 that has requested hand-off.

In Step S3, hand-off request processor 28 allocates the call of mobile station 10 that has requested hand-off to the queue in queue unit 31 that is of the class corresponding to the amount of relative change in received signal intensity extracted in Step S2.

Figure 7B:
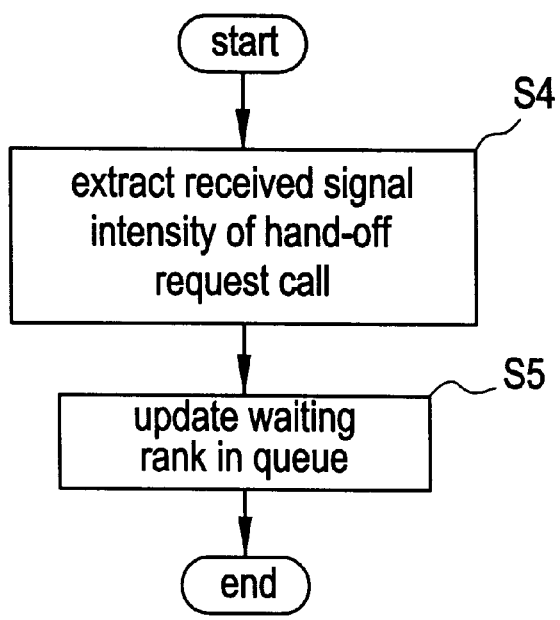
FIG. 7b is a flow chart illustrating procedures in waiting rank determination unit 34.

Explanation will next be presented with reference to FIG. 7b regarding the operation of waiting rank determination unit 34.

In Step S4, waiting rank determination unit 34 extracts the received signal intensity of mobile station 10 that has requested hand-off processing from received signal intensity table 33. In Step S5, the waiting rank of the call of mobile station 10 within the queue to which the call of mobile station 10 that has requested hand-off is assigned is determined under the control of waiting rank determination unit 34 based on the received signal intensity extracted in Step S4. The waiting ranks of calls in each of queues 31-1–31-n are updated each time the received signal intensities stored in received signal intensity table 33 are updated.

Figure 8:
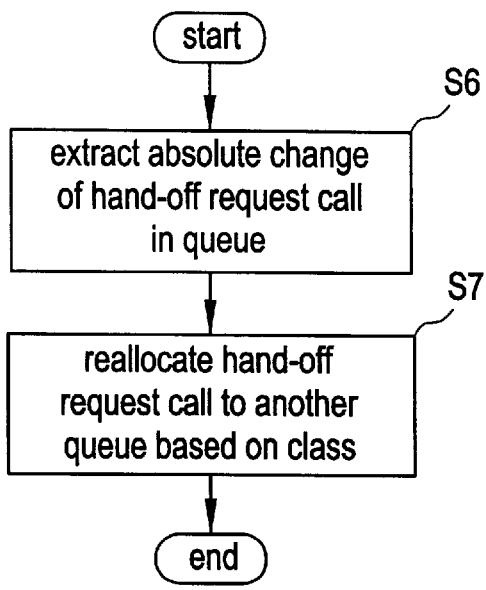
FIG. 8 is a flow chart illustrating procedures in queue reallocation unit 35.
Figure 9:
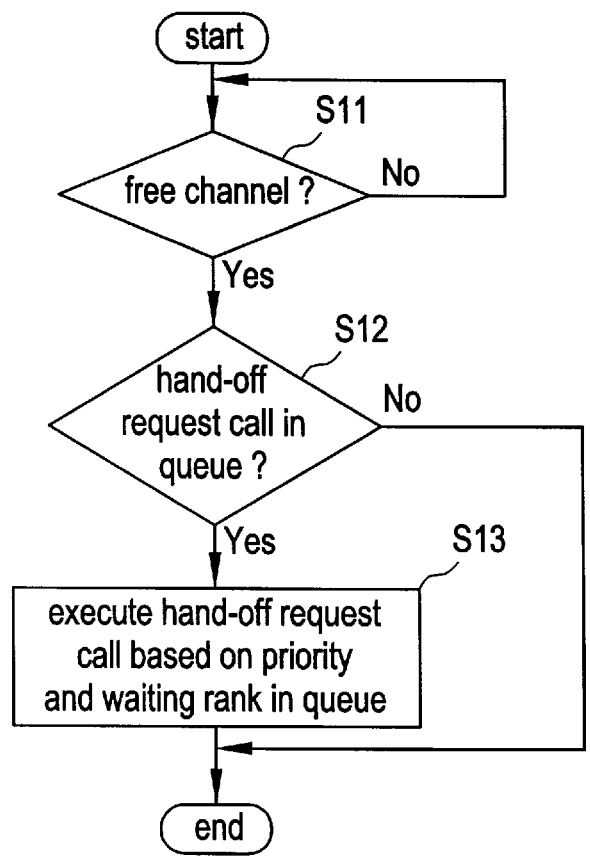
FIG. 9 is a flow chart illustrating procedures in queue control unit 32.

As shown in FIG. 8, in Step S6, queue reallocation unit 35 periodically extracts the amounts of relative change of the hand-off request calls stored in each of queues 31-1–31-n from relative change table 25. Then, when a hand-off request call stored in a particular queue no longer belongs to the class corresponding to that queue due to updating of the amount of relative change, queue reallocation unit 35 reallocates the hand-off request call to another queue that corresponds to that class in Step S7.

Meanwhile, queue control unit 32 first checks whether or not free channels are present within cell 30b in Step S11. If the result of the check in Step S11 is "Yes", queue control unit 32 checks whether or not hand-off request calls are present within queues 31-1–31-n in queue unit 31 in Step S12. If the result of the check in Step S12 is "Yes", the hand-off request calls existing within queues 31-1–31-n are assigned to free channels within cell 30b in an order that is based on the priority and the waiting rank within queues 31-1–31-n in Step S13.

As for the priority of queues 31-1–31-n, queue 31-1 has the highest priority and queue 31-n has the lowest priority, and hand-off request calls are therefore sequentially processed with hand-off request calls in queue 31-1 being processed first, followed by hand-off request calls in queue 31-2, hand-off request calls in queue 31-3, and so on down to hand-off request calls in queue 31-n. If a plurality of calls are present within the same queue, the calls are sequentially processed in an order based on the waiting rank determined by waiting rank determination unit 34. If there are a plurality of calls within the same queue that have the same waiting rank, the calls are processed in the order in which they were allocated to that queue.

In the event that the received signal intensity and the amount of relative change in received signal intensity stop being notified from mobile station 10 and calls for which mobile station 10 has requested hand-off remain in queues 31-1–31-n, the remaining calls are discarded from the queues without being processed in queue control unit 32, and hand-off processing is carried out for calls given the next waiting rank.

Further, in the event mobile station 10 is unable to hand off within the hand-off area, processing in queue control unit 32 of calls for which hand-off has been requested by mobile station 10 is not carried out, and hand-off processing is carried out for calls given the next waiting rank.

Normal processing is carried but when new calls originate.

In this embodiment, the amount of relative change in received signal intensity at mobile station 10 is calculated by relative change calculator 15 within mobile station 10 and is notified together with the received signal intensity at mobile station 10 to base stations 20a and 20b. However, a means for calculating the amount of relative change in received signal intensity at mobile station 10 for each measurement interval based on the received signal intensity notified from mobile station 10 may be provided within base stations 20a and 20b or the exchange which is host device 50 of base stations 20a and 20b, whereby only the received signal intensity need be notified to base stations 20a and 20b from mobile station 10, and the amount of relative change in the received signal intensity at mobile station 10 for each measurement interval is calculated by the base stations or the exchange.

Hand-off processing is carried out in an order based on the speed of movement of the mobile station in the explanation of this embodiment. However, since priority in this invention is determined based on the amount of relative change in the received signal intensity of the mobile station, the path of movement of the mobile station may be taken into consideration and hand-off processing carried out in an order based on the speed away from the base station.

Figure 10:
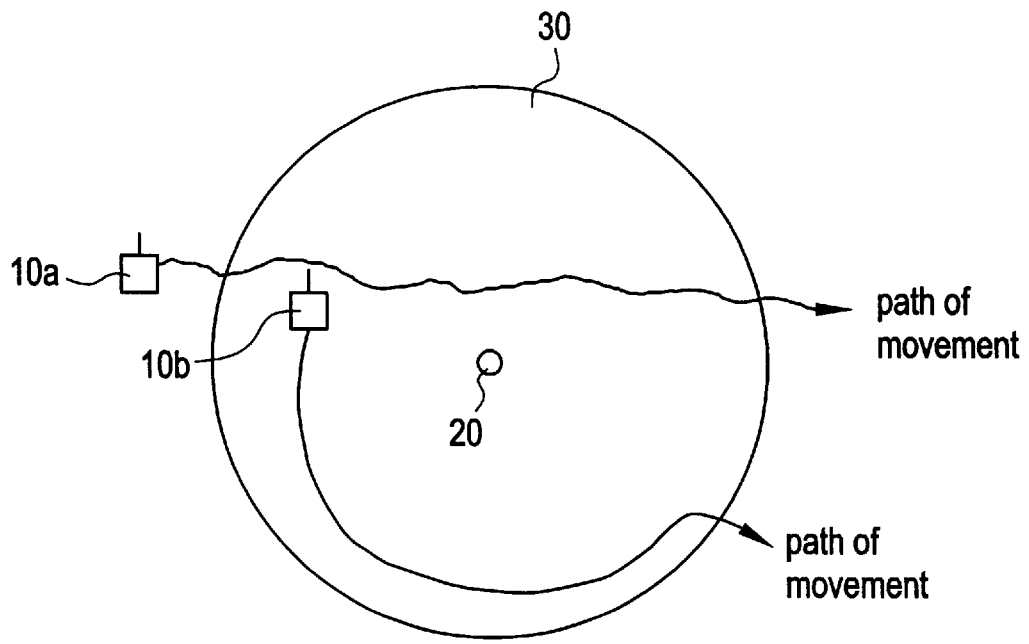
FIG. 10 is an explanatory view showing the control according to the path of movement of a mobile station in the hand-off control system shown in FIG. 2.

Assume that mobile station 10a moves linearly across cell 30 of base station 20, while mobile station 10b moves during a prescribed interval within cell 20 at a substantially uniform distance from base station 20, as shown in FIG. 10. In this example, mobile station 10a and mobile station 10b have the same speed of movement.

Although the received signal intensity of mobile station 10a changes, the received signal intensity of mobile station 10b remains substantially uniform during the prescribed interval. The amount of relative change in received signal intensity for mobile station 10a is thus greater, and in the event that hand-off processing is requested in mobile stations 10a and 10b, the hand-off request call for mobile station 10a will be given higher priority than the hand-off request call for mobile station 10b and accordingly will be processed first.

Second Embodiment

Explanation will next be presented regarding hand-off control system according to the second embodiment of the invention. In the first embodiment, when the amount of relative change in received signal intensity stored in relative change table 25 is updated, queue reallocation unit 35 reallocated hand-off request calls in queues 31-1–31-n of the queues according to the updated amounts of relative change. When the received signal intensities stored in received signal intensity table 33 is updated, waiting rank determination unit 34 updates waiting ranks within queues 31-1–31-n.

In the event that the amount of relative change fluctuates in the vicinity of a threshold level for classifying different queues, however, reallocation by queue reallocation unit 35 is effected at high frequency, putting a heavy processing on control unit 27.

Figure 11:
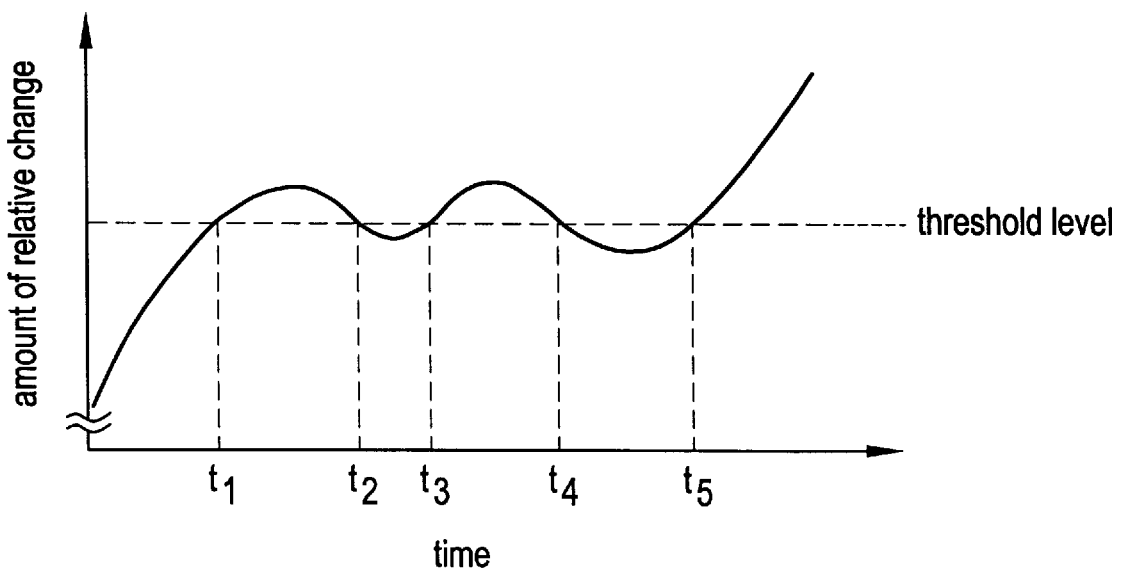
FIG. 11 shows the change in the amount of relative change in the hand-off control system according to the first embodiment of the invention.

If the amount of relative change fluctuates, for example, as shown in FIG. 11, queue reallocation unit 35 performs reallocation at times $t_1$, $t_2$, $t_3$, $t_4$, and $t_5$.

Similarly, fluctuation in received signal intensity in the vicinity of the threshold level for updating waiting rank within a queue causes waiting rank determination unit 34 to update waiting rank at high frequency, again placing a heavy processing load on control unit 27.

The hand-off control system of this embodiment is intended for reducing the processing load in the foregoing cases, and therefore differs from the first embodiment in the processing operations during updating in waiting rank determination unit 34 and queue reallocation unit 35. Other processing operations and construction of this embodiment are equivalent to those of the first embodiment.

Operation in the hand-off control system according to this embodiment will next be described with reference to FIG. 12 and FIG. 13.

Figure 12:
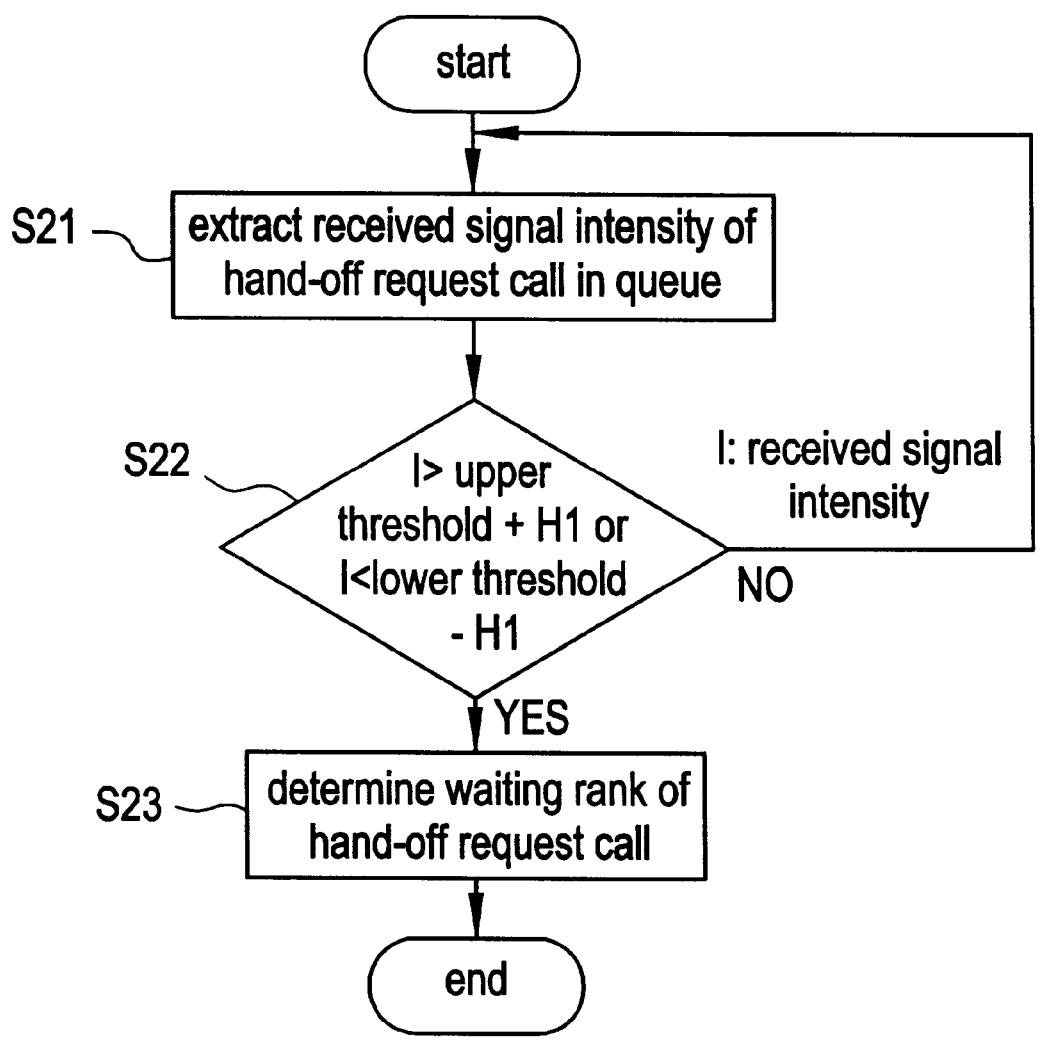
FIG. 12 is a flow chart illustrating procedures in waiting rank determination unit 34 in the hand-off control system according to the second embodiment of the present invention.
Figure 13:
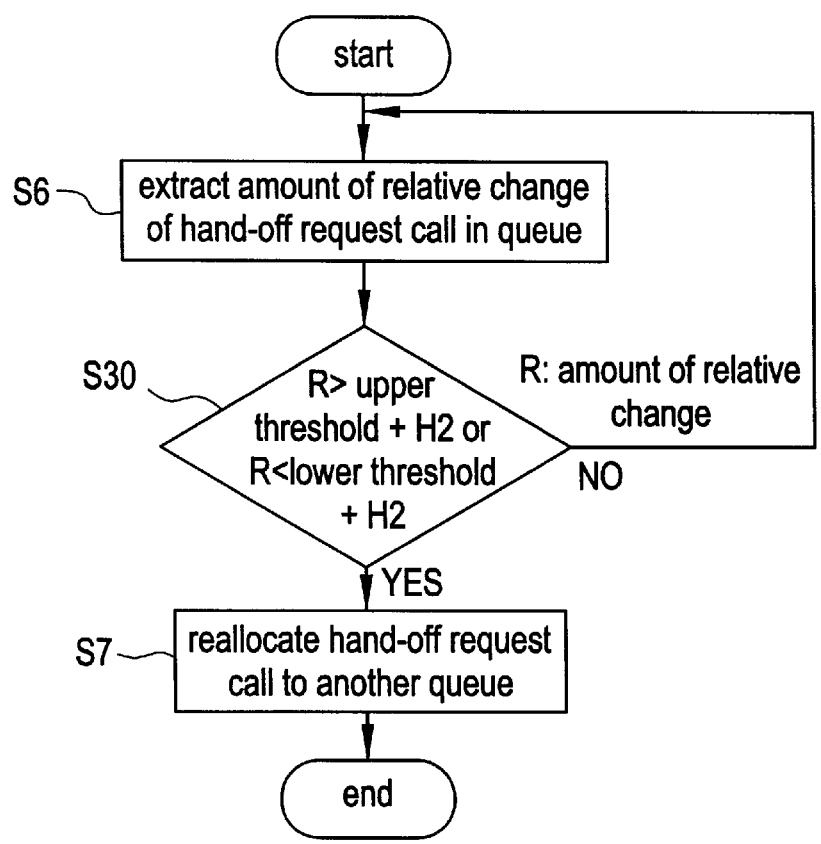
FIG. 13 is a flow chart illustrating procedures in queue reallocation unit 35 in the hand-off control system according to the second embodiment of the present invention.

Explanation is first presented regarding the operation of waiting rank determination unit 34 using FIG. 12.

In Step S21, waiting rank determination unit 34 extracts from received signal intensity table 33 the received signal intensity of mobile station 10 that has requested hand-off processing.

Waiting rank determination unit 34 then determines whether or not the received signal intensity extracted from received signal intensity table 33 in Step S22 is greater than a value obtained by adding a predetermined hysteresis value (H1) to the upper threshold value of the current waiting rank of the hand-off request call or lower than a value obtained by subtracting a predetermined hysteresis value (H1) from the lower threshold value of the current waiting rank of the hand-off request call.

If the result of the determination in Step S22 is "Yes", waiting rank determination unit 34 determines the waiting rank of the call of mobile station 10 within the queue to which the hand-off request call of mobile station 10 has been allocated in Step S23 based on the received signal intensity extracted in Step S21.

The upper threshold in Step S22 is the value of the received signal intensity of a hand-off request call that is set one rank ahead of the waiting rank of the hand-off request call for which processing is being carried out, and the lower threshold is the value of the received signal intensity of the hand-off request call that is set one rank after the hand-off request call being processed.

The operation of queue reallocation unit 35 will next be described using FIG. 13.

Queue reallocation unit 35 periodically extracts from relative change table 25 the amounts of relative change of hand-off request calls stored in each of queues 31-1–31-n in Step S6.

In Step S30, queue reallocation unit 35 determines whether or not the amount of relative change extracted from relative change table 25 is greater than a value obtained by adding a predetermined hysteresis value (H2) to the upper threshold value of the class of the queue to which the hand-off request call is currently assigned or less than a value obtained by subtracting the predetermined hysteresis value (H2) from the lower threshold value of the class of the queue to which the hand-off request call is currently assigned.

If the result of the determination in Step S30 is "Yes", and if a hand-off request call stored in a particular queue no longer belongs to the class corresponding to that queue as a result of updating of the amount of relative change, queue reallocation unit 35 reallocates the hand-off request call to another queue that corresponds to that class in Step S37.

In the case in which a hand-off request call corresponds, for example, to class 2 in FIG. 4, the, upper threshold value in the shown of Step S30 is a level at the boundary between class 2 and class 3, and the lower threshold value is a level at the boundary between class 1 and class 2.

Figure 14:
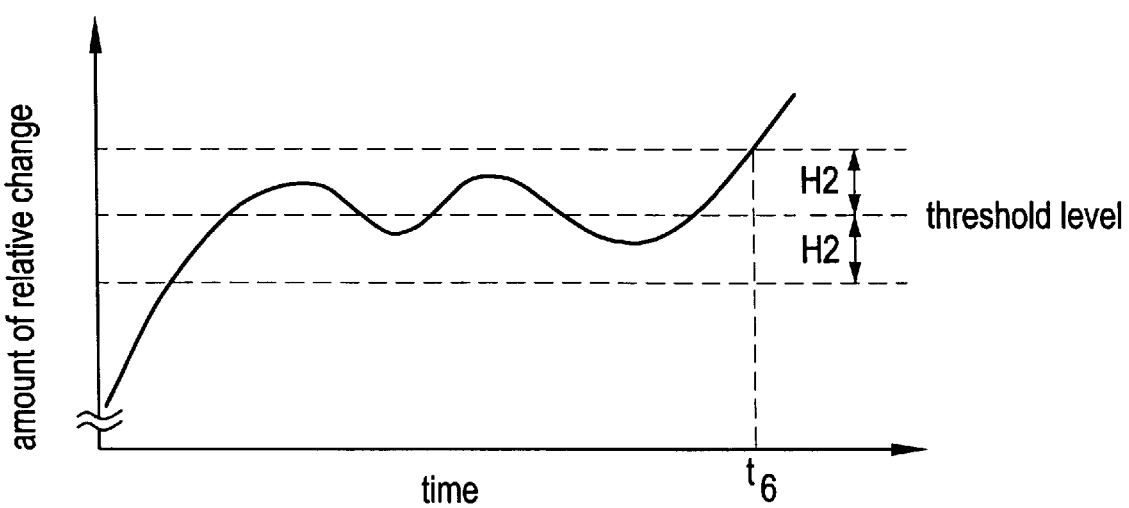
FIG. 14 shows the change in the amount of change in the hand-off control system according to the second embodiment of the invention.

If the amount of relative change fluctuates as shown in FIG. 14, reallocation by queue reallocation unit 35 is performed just once at time $t_6$. This demonstrates that the number of updating is reduced from the case shown in FIG. 11, in which reallocation is carried out five times.

In this embodiment, the use of a hysteresis characteristic in the judgment when determining waiting rank by waiting rank determination unit 34 and when reallocating to queues by queue reallocation unit 35 enables the number of updating processes to be reduced, thereby cutting the amount of control processing.

Although the present embodiment has been described regarding a case in which a hysteresis characteristic is used in both when determining waiting rank by waiting rank determination unit 34 and reallocating to queues by queue reallocation unit 35, it is understood that the present invention is not limited to this form, and the hysteresis characteristic may be used in only one of the processes.

While preferred embodiments of the present invention have been described using specific terms, such description is for illustrative purposes only, and it is to be understood that changes and variations may be made without departing from the spirit or scope of the following claims.

What is claimed is:

1. A hand-off control system for performing a hand-off process of a mobile station that is carrying out communication operations by way of a base station within a cell when said mobile station moves between a plurality of cells, said system comprising:
    measuring means for periodically measuring intensity of signals received from said base station at said mobile station;
    calculating means for calculating the amount of relative change in received signal intensity measured by said measuring means for each measurement interval;
    queue storing means for storing queues that are given priority based on the amount of relative change in received signal intensity calculated by said calculating means;
    request processing means for, When hand-off is requested, allocating a call of the mobile station that has requested hand-off to the appropriate queue based on the amount of relative change in received signal intensity in the mobile station;
    waiting rank determining means for determining the waiting rank of a call of said mobile station within the queue in which the call of said mobile station has been allocated based on said intensity of received signals measured by said measuring means for every interval of measurement of the intensity of received signals;
    queue reallocating means for, when said amounts of relative change are updated, periodically reallocating calls stored in each of said queues for every measurement interval of said received signal intensity such that said calls are stored in queues according to the amount of relative change in received signal intensity; and
    queue control means for monitoring whether or not there are free channels within the destination cell of said mobile station, and when there are free channels in said cell, assigning calls allocated to that queue to said free channels in an order that is based on the priority of said queues and the waiting ranks within the queues.

2. A hand-off control system for performing a hand-off process of a mobile station that is carrying out communication operations by way of a base station within a cell when said mobile station moves between a plurality of cells;
    wherein said mobile station comprises:
        measuring means for periodically measuring intensity of signals received from said base station in said mobile station;
        calculating means for calculating the amount of relative change in received signal intensity measured by said measuring means for each measurement interval; and
        transmitting means for transmitting to said base station measurement results in said measuring means and calculation results in said calculating means;
    and wherein said base station comprises:
        interface means for notifying to the base station in an adjacent cell the intensity of received signals and the amount of relative change in received signal intensity transmitted from said mobile station, and, when hand-off is requested from said mobile station, notifying said hand-off request to the base station in an adjacent cell;
        queue storing means for storing queues that are given priority based on the amounts of relative change in received signal intensity that are notified by way of said interface means;
        request processing means for, when a hand-off request is notified by way of said interface means, allocating calls of the mobile station to the appropriate queue based on the amount of relative change in received signal intensity in the mobile station that requested hand-off;
        waiting rank determining means for determining the waiting rank of calls of said mobile station within a queue in which calls of said mobile station are allocated for every interval of measurement of said received signal intensity based on the received signal intensity measured by said measuring means;
        queue reallocating means for, when said amounts of relative change is updated, periodically reallocating calls stored in each of said queues for every interval of measurement of said received signal intensity such that the calls are stored in queues that correspond to the amount of relative change in received signal intensity; and
        queue control means for monitoring whether or not free channels are present within the destination cell of movement of said mobile station, and when free channels are present within said cell, assigning calls allocated within said queues to said free channels in an order that is based on the priority of said queues and the waiting rank within said queues.

3. A hand-off control system for performing a hand-off process of a mobile station that is, carrying out communication operations by way of a base station within a cell when said mobile station moves between a plurality of cells;
    wherein said mobile station comprises:
        measuring means for periodically measuring intensity of signals received from said base station in said mobile station; and
        transmitting means for transmitting to said base station measurement results by said measuring means;
    and wherein said base station comprises:
        interface means for notifying to the base station in an adjacent cell the intensity of received signals transmitted from said mobile station, and, when hand-off is requested from said mobile station, notifying said hand-off request to the base station in an adjacent cell;
        calculating means for calculating, for every interval of measurement, the amount of relative change in received signal intensity that was notified by way of said interface means;
        queue storing means for storing queues that are given priority based on the calculation results by said calculating means;

request processing means for, when a hand-off request is notified by way of said interface means, allocating the call of the mobile station to an appropriate queue based on the amount of relative change in received signal intensity in the mobile station that requested hand-off;

waiting rank determining means for determining the waiting rank of the call of said mobile station within a queue in which calls of said mobile station are allocated for every interval of measurement of said received signal intensity and based on the received signal intensity measured by said measuring means;

queue reallocating means for, when said amount of relative change is updated, periodically reallocating calls stored in each of said queues for every interval of measurement of said received signal intensity such that the calls are stored in queues that correspond to the amount of relative change in received signal intensity; and queue control means for monitoring whether or not free channels are present within the destination cell of movement of said mobile station, and when free channels are present within said cell, assigning calls allocated within said queues to said free channels in an order that is based on the priority of said queues and the waiting rank within said queues.

4. A hand-off control system according to claim 2, wherein:

said base station further comprises a first storing means for storing amounts of relative change in received signal intensity that are notified by way of said interface means; and said request processing means comprises means for, when a hand-off request is notified by way of said interface means, allocating the call of the relevant mobile station to an appropriate queue based on the amount of relative change in received signal intensity of said mobile station that is stored in said first storing means.

5. A hand-off control system according to claim 2, wherein:

said base station comprises a second storing means for storing received signal intensity notified by way of said interface means; and said waiting rank determining means comprises means for determining the waiting rank of the call of an appropriate mobile station within the queue to which the call of said mobile station is allocated based on the received signal intensity of said mobile station that is stored in said second storing means.

6. A hand-off control system according to claim 1, wherein the priority of queues is set higher as the amount of relative change in said received signal intensity increases.

7. A hand-off control system according to claim 1, wherein the amounts of relative change in said received signal intensity are grouped into classes by predetermined levels, and said queues are stored for every class.

8. A hand-off control system according to claim 1, wherein said waiting rank determining means includes means for determining the waiting rank of calls of said mobile station such that calls of said mobile station are ordered starting from calls for which said received signal intensity is weak.

9. A hand-off control system according to claim 1, wherein said waiting rank determining means comprises means for, when said received signal intensity of a particular hand-off request call is updated, determining whether said received signal intensity is greater than a value obtained by adding a predetermined first hysteresis value (H1) to an upper threshold value of the current waiting rank of the hand-off request call or less than a value obtained by subtracting said first hysteresis value (H1) from a lower threshold value of the current waiting rank of the hand-off request call; and for updating the waiting rank of the call stored in said queue only when said received signal intensity is greater than a value obtained by adding a predetermined first hysteresis value (H1) to an upper threshold value of the current waiting rank of the hand-off request call or less than a value obtained by subtracting said first hysteresis value (H1) from a lower threshold value of the current waiting rank of the hand-off request call.

10. A hand-off control system according to claim 1, wherein said queue reallocating means includes means for when said amount of relative change of a particular hand-off request call is updated, determining whether said amount of relative change is greater than a value obtained by adding a predetermined second hysteresis value (H2) to an upper threshold value of the class of the queue in which the relevant hand-off request call is currently allocated, or said amount of relative change is less than a value obtained by subtracting said second hysteresis value (H2) from a lower threshold value of the class of the queue in which the relevant hand-off request call is currently allocated; and for reallocating the call stored in each of said queues only in cases in which said amount of relative change is greater than a value obtained by adding a predetermined second hysteresis value (H2) to an upper threshold value of the class of the queue in which the relevant hand-off request call is currently allocated, or said amount of relative change is less than a value obtained by subtracting said second hysteresis value (H2) from a lower threshold value of the class of the queue in which the relevant hand-off request call is currently allocated.

11. A hand-off control method which is carried out when a mobile station that carries out communication operations by way of a base station in a cell moves between a plurality of cells, said method comprising the steps of:

periodically measuring the intensity of signals received from said base station in said mobile station;

calculating the amount of relative change for every interval of measurement in said received signal intensity that is measured;

when hand-off is requested, allocating the call of the mobile station that has requested hand-off to an appropriate queue among queues that are given priority in advance according to said amounts of relative change based on the relative change in the received signal intensity in said mobile station;

determining the waiting rank of the call of said mobile station within the queue in which the call of said mobile station is allocated based on the measured received signal intensity for every interval of measurement of said received signal intensity;

when said amount of relative change is updated, periodically reallocating calls stored in said queues for every interval of measurement of said received signal intensity such that calls are stored in queues in accordance with said updated amount of relative change; and monitoring whether or not free channels exist within the destination cell of said mobile station, and if free channels exist in said cell, assigning calls allocated to the queues to said free channels in an order based on priority of said queues and waiting ranks within said queues.

12. A hand-off control method according to claim 11, further comprising steps of:

storing in advance amounts of relative change in intensity of received signals of said base station at said mobile station; and if a hand-off request is made, allocating the call of said mobile station to a prescribed queue based on the amount of relative change in received signal intensity of the relevant mobile station that has been stored.

13. A hand-off control method according to claim 11, further comprising steps of:

storing in advance intensities of received signals of said base station at said mobile station; and determining the waiting rank of the call of said mobile station within a queue in which the call of said mobile station has been allocated based on the stored received signal intensity of the relevant mobile station.

14. A hand-off control method according to claim 11, further comprising a step of setting the priority higher with greater amounts of relative change in said received signal intensity.

15. A hand-off control method according to claim 11, further comprising steps of:

grouping the amounts of relative change of said received signal intensity into classes by predetermined levels; and preparing said queues for each class.

16. A hand-off control method according to claim 11, further comprising a step of determining waiting ranks of calls of said mobile stations such that the calls of said mobile stations are ordered starting from calls for which said received signal intensity is weak.

17. A hand-off control method according to claim 11, wherein the amount of relative change in said received signal intensity is defined as:

$(P_1-P_0)/(P_1+P_0)$ in a case in which a mobile station having a received signal intensity of $P_0$ at time $t_0$ moves and has a received signal intensity of $P_1$ at time $t_1$.

18. A hand-off control method according to claim 11, wherein the amount of relative change in said received signal intensity is defined as:

$(P_1-P_0)/P_1$ in a case in which a mobile station having a received signal intensity of $P_0$ at time $t_0$ moves and has a received signal intensity of $P_1$ at time $t_1$.

19. A hand-off control method according to claim 11, wherein the amount of relative change in said received signal intensity is defined as:

$(P_1-P_0)/P_0$ in a case in which a mobile station having a received signal intensity of $P_0$ at time $t_0$ moves and has a received signal intensity of $P_1$ at time $t_1$.

20. A hand-off control method according to claim 11, wherein the amount of relative change in said received signal intensity is defined as:

$(P_1-P_0)/(t_1-t_0)$ in a case in which a mobile station having a received signal intensity of $P_0$ at time $t_0$ moves and has a received signal intensity of $P_1$ at time $t_1$.

21. A hand-off control method according to claim 11, further comprising the steps of:

when said received signal intensity of a particular hand-off request call is updated and waiting ranks within each of said queues is being determined, determining whether said received signal intensity is greater than a value obtained by adding a predetermined first hysteresis value (H1) to the upper threshold value of the current waiting rank of the relevant hand-off request call or less than a value obtained by subtracting the first hysteresis value (H1) from the lower threshold value of the current waiting rank of the relevant hand-off request call; and updating the waiting ranks of the calls stored in each said queues only in a case in which said received signal intensity is greater than a value obtained by adding a predetermined first hysteresis value (H1) to the upper threshold value of the current waiting rank of the relevant hand-off request call or less than a value obtained by subtracting the first hysteresis value (H1) from the lower threshold value of the current waiting rank of the relevant hand-off request call.

22. A hand-off control method according to claim 11, further comprising the steps of:

when said amount of relative change of a particular hand-off request call is updated and calls stored in each of said queues are being reallocated, determining whether said amount of relative change is greater than a value obtained by adding a predetermined second hysteresis value (H2) to the upper threshold value of the class of the queue in which the relevant hand-off request call is currently allocated or less than a value obtained by subtracting the second hysteresis value (H2) from the lower threshold value of the class of the queue in which the relevant hand-off request call is currently allocated; and reallocating calls stored in each of said queues only in a case in which said amount of relative change is greater than a value obtained by adding a predetermined second hysteresis value (H2) to the upper threshold value of the class of the queue in which the relevant hand-off request call is currently allocated or less than a value obtained by subtracting the second hysteresis value (H2) from the lower threshold value of the class of the queue in which the relevant hand-off request call is currently allocated.

\* \* \* \* \*

UNITED STATES PATENT AND TRADEMARK OFFICE
CERTIFICATE OF CORRECTION

PATENT NO.    : 6,496,492 B1
DATED         : December 17, 2002
INVENTOR(S)   : Qing-An Zeng It is certified that error appears in the above-identified patent and that said Letters Patent is hereby corrected as shown below:

Column 5,
Line 67, delete "to" and insert therefor -- $t_0$ --.

Column 6,
Lines 22, 27, 32 and 38, delete "to" and insert therefor -- $t_0$ --.

Signed and Sealed this

Eighth Day of July, 2003

JAMES E. ROGAN
*Director of the United States Patent and Trademark Office*